J. H. STRONG.
Sewing-Machine Casters.
No. 150,264.
Patented April 28, 1874.
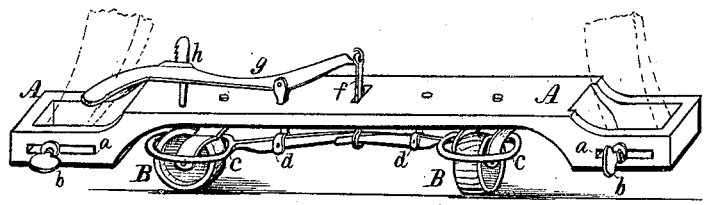

UNITED STATES PATENT OFFICE.

JOSEPH HENRY STRONG, OF ADEL, IOWA.

IMPROVEMENT IN SEWING-MACHINE CASTERS.

Specification forming part of Letters Patent No. 150,264, dated April 28, 1874; application filed March 17, 1874.

*To all whom it may concern:*

Be it known that I, JOSEPH HENRY STRONG, of Adel, in the county of Dallas and State of Iowa, have invented certain Improvements in Casters for Sewing-Machines, of which the following is a specification:

The object of my invention is to attach casters to the feet of sewing-machines and other stands, in such a manner that the machine or stand will continually rest thereon, and that the casters can be made movable and operative, or rigid and inoperative, at will, by adjusting a lever. It consists in a bar adapted to connect the stand feet with casters pivoted thereto, and within circular brakes that are mounted, carried, and operated upon the same bar, all as hereinafter fully set forth.

My drawing is a perspective illustrating the construction, application, and operation of my invention.

A A is the feet-connecting bar. It may be made of wood or metal, in any suitable manner. It is bent downward at the ends to leave its central portion bowed and elevated. Recesses in the ends are designed to receive the feet of the machine or stand. They must necessarily vary in form to suit feet of various forms. $a$ $a$ are slots in the sides and ends of the bar, made to intersect the recesses in the tops. Set-screws $b$ $b$ are passed through and adjusted therein to clamp and lock the bar and its casters to the stand or machine. B B are common swivel-casters pivoted under the elevated portion of the bar A, and in the center of ring-form brakes that will always, when operated, engage the caster-wheels, regardless of the direction assumed by the casters. $c$ $c$ are brakes suspended by the fulcrums $d$, pendent from the central portion of the bar A. Their inner ends and long-arm levers rest in the hook, loop, or link $f$, that is passed upward through an opening in the middle of the bar A. Their outer ends and short-arm levers terminate in rings that surround the casters. The inner surface of the rings may be beveled or concave to improve their gripe upon the casters when they are applied as brakes to hold the casters rigidly and inoperative. $g$ is a lever mounted upon the top of the central portion of the bar A, and connected with the long-arm levers of the brakes $c$ $c$ by means of the link $f$. $h$ is an upright toothed pin or rack attached to the end and top of the bar A. Its teeth correspond in form with the edge of the lever $g$, by which they are engaged.

Pressing the free end of the lever $g$ downward causes its short end to rise and, by means of the link $f$, draw up the levers of the brakes $c$, and press down the ring-form brakes to engage the caster-wheels. Allowing the edge of the lever $g$ to engage the rack $h$ affords a means of locking the ring-brakes upon the caster-wheels to make them inoperative whenever desired.

A person may, therefore, by pressure with a foot, lock and unlock the casters at will, and thereby allow the machine mounted upon my attachments (one is designed to be under each end) to stand firmly upon a solid base or rest loosely upon caster-wheels that will allow the machine to be moved without lifting.

I claim as my invention—

1. The ring-form brakes $c$, when constructed to inclose and engage swivel-casters B, substantially as described, and for the purposes specified.

2. An attachment for sewing-machines and stands composed of the bar A, casters B, set-screws $b$, ring-form brakes $c$, and their fulcrums $d$, the link $f$, the lever $g$, and the rack $h$, all arranged, constructed, and operating substantially as described and shown, for the purpose set forth.

JOSEPH HENRY STRONG.

Witnesses:
   E. GOUGHNOUR,
   J. W. COONS.